(12) United States Patent
Lewis

(10) Patent No.: US 10,795,172 B1
(45) Date of Patent: Oct. 6, 2020

(54) APPARATUS AND METHOD OF COMBINING MULTIPLE LASER BEAMS USING A NEGATIVE FOCAL LENGTH RADIAL GRADIENT INDEX ROD LENS

(71) Applicant: Casey Lewis, Anchorage, AK (US)

(72) Inventor: Casey Lewis, Anchorage, AK (US)

(\*) Notice: Subject to any disclaimer, the term of this patent is extended or adjusted under 35 U.S.C. 154(b) by 117 days.

(21) Appl. No.: 16/136,763

(22) Filed: Sep. 20, 2018

(51) Int. Cl.
*G02B 27/30* (2006.01)
*H01S 3/00* (2006.01)
*G02B 27/10* (2006.01)
*G02B 27/09* (2006.01)
*G02B 3/00* (2006.01)

(52) U.S. Cl.
CPC ......... *G02B 27/30* (2013.01); *G02B 27/0961* (2013.01); *G02B 27/1006* (2013.01); *H01S 3/005* (2013.01); *G02B 3/0087* (2013.01)

(58) Field of Classification Search
CPC ...... G02B 3/0087; G02B 27/30; G02B 27/10; G02B 27/1006; G02B 27/106; G02B 27/0961; G02B 27/12; H01S 3/005
USPC .................................. 359/641, 652–654, 639
See application file for complete search history.

(56) References Cited

U.S. PATENT DOCUMENTS

| | | | | |
|---|---|---|---|---|
| 4,770,506 A * | 9/1988 | Baba | ................... | G02B 3/0087 359/654 |
| 4,810,069 A * | 3/1989 | Kobayashi | ........... | G02B 3/0087 359/653 |
| 4,848,882 A * | 7/1989 | Suzuki | ................... | G02B 6/425 359/652 |
| 5,369,661 A * | 11/1994 | Yamaguchi | .......... | G02B 3/0087 372/101 |
| 5,465,265 A * | 11/1995 | Ota | ........................ | G02B 3/005 257/88 |
| 5,815,318 A * | 9/1998 | Dempewolf | ......... | G02B 3/0087 359/653 |
| 5,917,105 A * | 6/1999 | Xu | ........................ | G02B 3/0087 264/1.32 |
| 6,369,925 B1 * | 4/2002 | Agurok | .............. | G02B 27/1073 359/618 |
| 7,639,722 B1 * | 12/2009 | Paxton | ............... | G02B 27/0972 359/831 |
| 7,881,355 B2 * | 2/2011 | Sipes, Jr. | ............. | G02B 6/4296 372/50.12 |
| 8,184,361 B2 * | 5/2012 | Rothenberg | ........ | H01S 3/06754 359/341.1 |
| 8,351,127 B2 * | 1/2013 | Black, Jr. | ............. | G02B 3/0087 359/641 |
| 8,503,840 B2 * | 8/2013 | Hu | ....................... | B23K 1/0008 385/33 |
| 9,244,274 B2 * | 1/2016 | Ma | ..................... | G02B 27/0025 |

(Continued)

*Primary Examiner* — Zachary W Wilkes
(74) *Attorney, Agent, or Firm* — Michael J. Tavella

(57) ABSTRACT

An apparatus and an improved method of combining multiple laser beams into a single output beam, using a Gradient-Index (GRIN) rod with a negative, radial gradient. Using a rod of sufficient diameter and length, the input angle of a laser could be increased to allow room for a second laser to be placed beside the first laser, such that the beam enters the rod at any point within a certain acceptance cone, and at an angle determined by its place within that cone, ranging from zero degrees to the maximum acceptance angle. This can be used to allow an almost unlimited number of lasers to be use to boost the energy, power, or altering the apparent color of lasers by combining multiple beams along a single axis.

9 Claims, 14 Drawing Sheets

FIG. 3-1   FIG. 3-2   FIG. 3-3

(56) References Cited

U.S. PATENT DOCUMENTS

| | | | |
|---|---|---|---|
| 9,366,872 B2* | 6/2016 | Honea | G02B 27/0927 |
| 9,383,561 B1* | 7/2016 | Mitchell | H01L 27/14629 |
| 10,133,079 B2* | 11/2018 | Sekine | G02B 5/04 |
| 10,551,583 B1* | 2/2020 | Stone | G02B 6/32 |
| 2003/0026535 A1* | 2/2003 | Ukrainczyk | G02B 6/32 |
| | | | 385/33 |
| 2014/0003456 A1* | 1/2014 | Mikliaev | G02B 27/0927 |
| | | | 372/29.014 |

\* cited by examiner

APPARATUS AND METHOD OF COMBINING MULTIPLE LASER BEAMS USING A NEGATIVE FOCAL LENGTH RADIAL GRADIENT INDEX ROD LENS

CROSS REFERENCE TO RELATED APPLICATIONS

Not Applicable

STATEMENT REGARDING FEDERALLY SPONSORED RESEARCH AND DEVELOPMENT

Not Applicable

BACKGROUND OF THE INVENTION

1. Field of the Invention

This invention relates to boosting the energy, power, or altering the apparent color of lasers by combining multiple beams along a single axis and particularly to an improved method of combining multiple laser beams using a negative focal-length, radial gradient-Index rod/lens.

2. Description of the Prior Art

Since the 1960s, when the first laser was developed, scientists have searched for a way to boost the power of laser beams for a variety of applications, ranging from industrial, medical, military, scientific, analytical or entertainment applications. The obvious method is to increase the size and input energy for a laser. However, with any type of laser, there are limitations that prevent this approach from exceeding a certain maximum. One method to overcome these limitations is to develop a different type of laser, which has much higher power output. This method can be very expensive and often comes at the cost of more complicated operation and consumable materials, such as gases, dyes and solvents, or the need for precise temperature and flow control. Another method is to boost the power of a laser beam by passing it through a mirror-less pumping-cavity, or several boosting cavities in a row, allowing the beam to receive extra gain from each. This method also has limitations in size, scalability, and complications in operation.

Another method that has been tried for decades is to combine the outputs from multiple lasers in such away that they behave as one beam, either coherently or incoherently. Although this sounds simple, this method has proven one of the more challenging over the decades. A laser beam progresses along a perfectly straight line, and since the laser oscillator itself (hereon referred to as "laser") must have a certain size, taking up a certain amount of space, it is impossible to project two or more laser beams along the same line. In the same way, a standard mirror cannot be used, since the angle of incidence always equals the angle of reflection, the beams must be in-line before reflecting in order to be in-line after reflecting. Likewise, optics that refract light at the incident surface (interface), such as a prism, will not work for beams of the same wavelength, because the refracted angle is in direct proportion to the angle of incidence. Thus, two beams must approach such an interface at the same angle in order to exit at the same angle. (The exception is when the beams are of different wavelengths, which is discussed later.)

Despite these difficulties, methods for combining multiple beams have been devised, utilizing the properties of certain optical components. These methods can generally be divided into spectral scaling and power scaling methods. Spectral scaling methods work by combining beams with different wavelengths, while power scaling can combine multiple beams of the same wavelength.

The earliest method for combing multiple laser beams is by using a beam splitter. By projecting a laser onto a beam splitter at a 45-degree angle, a certain percentage of the beam can be reflected while the remaining percentage, minus absorption losses, transmits straight through the beam splitter. When another beam is projected onto the beam splitter from the opposite side, also at a 45-degree angle, the portion that reflects can be combined with the portion transmitted by the first laser, while the percentage that transmits combines with the percentage reflected from the first laser. However, with this method, the two input beams are combined into two output beams in which the output power of each beam matches the input power from each. Thus, there is no net increase in power of the output beams; note that this method is only suitable for combining beams of different wavelengths, for example, combining a red beam and a green beam to produce two beams that appear yellow.

In another method of spectral scaling, by using a dichroic mirror, a beam of a certain wavelength cart be reflected at a 45-degree angle with almost total reflectivity, transmitting almost no light. When a beam of a different wavelength is projected onto the other side of the mirror, nearly all of the light transmits through with very little reflection. In this way, both beams can be combined at a power level that nearly equals the sum of each input beam. By adding yet another dichroic mirror into the chain, a third laser can be added to the first two, provided it is a different wavelength from the first two. Problems with this method are that the power can only be scaled up a limited number of times until the available wavelengths per mirror are used up. As more dichroic mirrors are added, the entire system becomes much larger and more complicated to align and operate. Another problem is that the various wavelengths will focus at different focal planes when using a refracting lens, making this method impractical for normal industrial operations. Thus, it is only practical when scaling up the spectral properties of the laser beam, but not for scaling the usable power output of the combined beams.

Power scaling is performed by combining beams of the same wavelength. Other methods of combining laser beams include use of dichroic mirrors, use of a polarizing mirror, use of controlled interference, and use of diffraction gratings, all of which have problems.

Most recently, the tiled-aperture approach has been successful in combining multiple beams. This method combines beams by emitting them through multiple, closely spaced apertures or lenses, producing an output in which the beam profiles do not overlap. Thus, the output beam consists of many parallel, closely-spaced beams that are not concentric with each other, but rather run side-by-side, parallel to each other. In near-field proximity, the tiled-aperture method produces a beam that behaves as multiple beams, in the far field, the divergence of the beams begins to add the power into what is effectively one beam with a larger radius than the individual beams. In this case the overall beam will behave as one beam with many hot-spots, or "lobes" (spikes in the power distribution or bright spots), within the beam profile. However, if the phase of each beam is controlled so that it is in phase with every other beam, the beams will be coherent with each other. In this case, the far field beam behaves as a central beam with increased intensity surrounded by many smaller beams (lobes) of lowered intensity. Therefore, by coherently combining through a tiled aperture, the power can be multiplied. This method can produce very good intensities, but is also complicated to construct and is limited in scalability.

BRIEF DESCRIPTION OF THE INVENTION

The object of this invention provides for an improved method of combining multiple laser beams into what is essentially a single output beam, using a Gradient-Index (GRIN) rod with a negative, radial gradient. When a laser is projected into the end of a negative GRIN rod with a flat input-interface, off of center and at angle, the beam could be directed along a curved path within the rod such that it reached alignment with the rod (zero-degree angle) in the center of the rod. This angle is a fixed one, determined by the gradient of the rod, the wavelength of the laser, and laser beam's entry position along the radius of the rod face. Moreover, upon entering alignment with the rod, the beam discontinues following a curved path but remains in alignment with the rod, while the circumference begins diverging in all radial directions. By using a rod of sufficient diameter and length, per the gradient, the input angle can be increased to allow room for a second laser to be placed beside the first laser, such that the beam enters the rod at any point within a certain acceptance cone and at any angle determined by the place within the cone, ranging from zero degrees to the maximum acceptance angle, wherein the two beams can be made to merge into the center of the rod. Upon merging, both beams then diverge as overlapping beams, combining them into essentially one beam.

A GRIN rod with a negative gradient behaves like a concave lens with a negative focal length; whereby the natural tendency of such a rod is to diverge a beam. Therefore, any beam projected into a rod of sufficient length will exit with a diameter that is greater than the diameter of the rod. By using an array of lenses to control the input divergence (convergence, or focusing half-angle), the natural tendency of the rod to diverge the beam can be countered to a certain degree, such that the beam comes into focus within the rod, and then exits with a much smaller diameter and divergence. By precisely controlling the focal length of the input lenses, their angle, and their distance from the end face of the rod, the beams can then be made to exit the rod at a minimum diameter and divergence that equals the input beams' diameter and convergence. The individual beams can then be made to retain a mostly beam-like shape as they travel through the rod, all merging into one beam at the ½ pitch length. By repositioning the lenses a greater distance from the rod, the beams can be made to come into focus at the input face of the rod, thus exiting the rod at a much greater divergence and a diameter nearly equaling that of the rod. A rod of ½ pitch produces the smallest output beam and the least divergence, while beams projected into a longer rod merge at the ½ pitch length, and then begin diverging in accordance with the gradient of the rod. Thus laser beams entering within the acceptance angle of a ½ pitch rod can be made to exit the rod at their original entry diameter and angle of divergence. From the standpoints of focusing and collimation, there is a direct correlation between beam diameter and divergence, making the latter a more desirable option. Where higher power output is needed and greater output divergence can be tolerated, a rod longer than ½ pitch can be used.

By using an array of input lenses, each lens with the same focal length, and each positioned at a precise distance from the input end-face of the rod, the input beams can be made to focus (reach their smallest waist diameter) at the ¼ pitch length, before the ½ pitch length, they can be made to focus at the input end-face of the rod; or can be prevented from coming into focus at all, depending on the beams' diameter and divergence upon entering the face of the rod. This provides a maximum and a minimum projection length, at which the lenses in the array can be mounted to control the output diameter and divergence from a minimum to a maximum.

Each of these input choices has benefits and drawbacks. Since the only limitation on power is the damage threshold of the substrate, a higher divergence allows for higher energy levels to pass through the rod. A lens array positioned at the minimum projection length allows for less power input, but provides better alignment of the beams and the lowest output divergence. On the other hand, if the input lens array is positioned at the maximum projection length, the power output is highest and output divergence begins to rise. Beam alignment is explained in the following sections.

Depending on the diameter and length of the rod, there is no limit to how many lasers can be added. The input laser beams all follow a cone, or hourglass path, to the center of the rod, so an unlimited number of laser beams can be added to any point on the flat-face of the rod. The only limitation here is how many lasers can physically be fitted around the face of the rod. All input beams tend to behave as rays, making up part of the overall cone of light with a greater convergence (negative divergence) than the convergence of the individual beams, all following that hourglass shape into the center of the rod at the ½ pitch length (waist diameter), where all then merge and begin to diverge as one beam following a single axis.

BRIEF DESCRIPTION OF THE DRAWINGS

FIG. 3-1 is an enlarged diagrammatic view of the portion of FIG. 3 labeled 3-1.

FIG. 3-2 is an enlarged diagrammatic view of the portion of FIG. 3 labeled 3-2.

FIG. 3-3 is an enlarged diagrammatic view of the portion of FIG. 3 labeled 3-3.

FIG. 3a also shows the delineation of the enlarged detail views on FIG. 3a as FIG. 3a-1, FIG. 3-2 and FIG. 3a-3.

FIG. 3a-1 is an enlarged diagrammatic view of the portion of FIG. 3a labeled 3a-1.

FIG. 3a-2 is an enlarged diagrammatic view of the portion of FIG. 3a labeled 3a-2.

FIG. 3a-3 is an enlarged diagrammatic view of the portion of FIG. 3a labeled 3a-3.

DETAILED DESCRIPTION OF THE INVENTION

This invention uses negative gradient index lenses. A gradient index lens is a lens that has a refractive index that changes throughout its substrate.

GRIN rods with a negative gradient have the lowest refractive index at the central axis of the rod, and highest near the circumference. These rods are much more difficult to make with current techniques, and thus have received much less study. Light rays passing through such a rod will travel along a hyperbolic path. A negative GRIN rod in many respects behaves similar to a lens with a negative focal-length (that is, a concave lens). However, a long rod can have a very short focal length, such that the apparent focal point is located within the rod, and a cone of light can be collimated to a very small diameter over a relatively long distance.

As is well known, light can be described as rays following ray paths that are perpendicular to the wavefront, and, within materials that have a constant refractive-index, these rays progress in perfectly straight lines through the medium. However, a radial GRIN rod has a refractive index (n) that changes from the circumference ($n_{rmax}$) to the central axis ($n_0$) A single GRIN rod can be thought of as a stack of homogeneous lenses, each having an infinitely-small thickness and an optical power determined by the gradient constant (A) of the rod. Due to this, light rays passing through such a GRIN rod travel not in straight lines but follow a curved path. This provides much greater diversity than lenses with homogeneous refractive-indices. Homogeneous lenses refract rays only at the surfaces, as defined by Snell's Law, yet travel in straight lines as they pass through the thickness of the lens. On the other hand, in paraxial ray modeling, a single GRIN rod can be thought of as multiple lenses, consisting of no less than three, spaced by distances that total a distance equal to the length of the rod, yet each having a thickness that is infinitely small (smaller than the wavelength of the light). This provides new possibilities that are not achievable with homogeneous lenses that have a cross-sectional thickness of their own.

Figure 1:
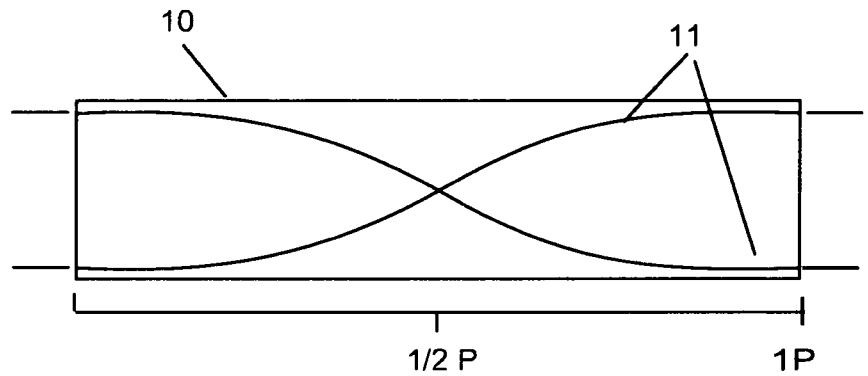
FIG. 1 is a diagrammatic view of a positive gradient GRIN rod showing the effect on light rays entering the lens and at the ½ P and 1P positions.

FIG. 1 is a diagrammatic view of a positive gradient GRIN rod 10 showing the effect on light rays 11 entering the lens and at the ½ P and 1P positions.

Figure 2:
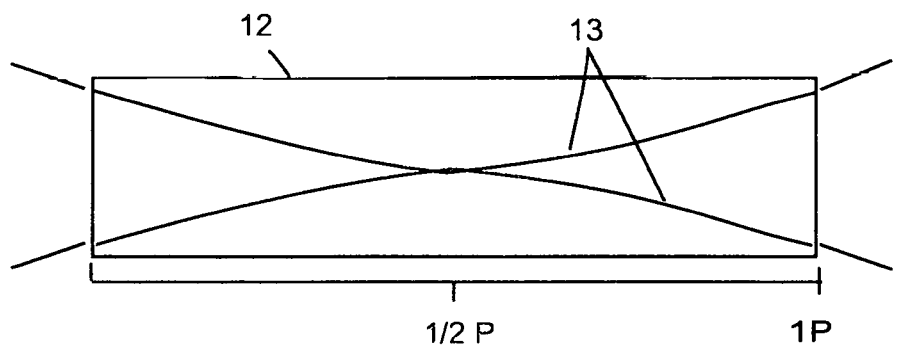
FIG. 2 is a diagrammatic view of a negative gradient GRIN rod showing the effect on light rays entering the lens and at the ½ P and 1P positions.

FIG. 2 is a diagrammatic view of a negative gradient GRIN rod 12 showing the effect on light rays 13 entering the lens and at the ½ P and 1P positions.

Figure 3:
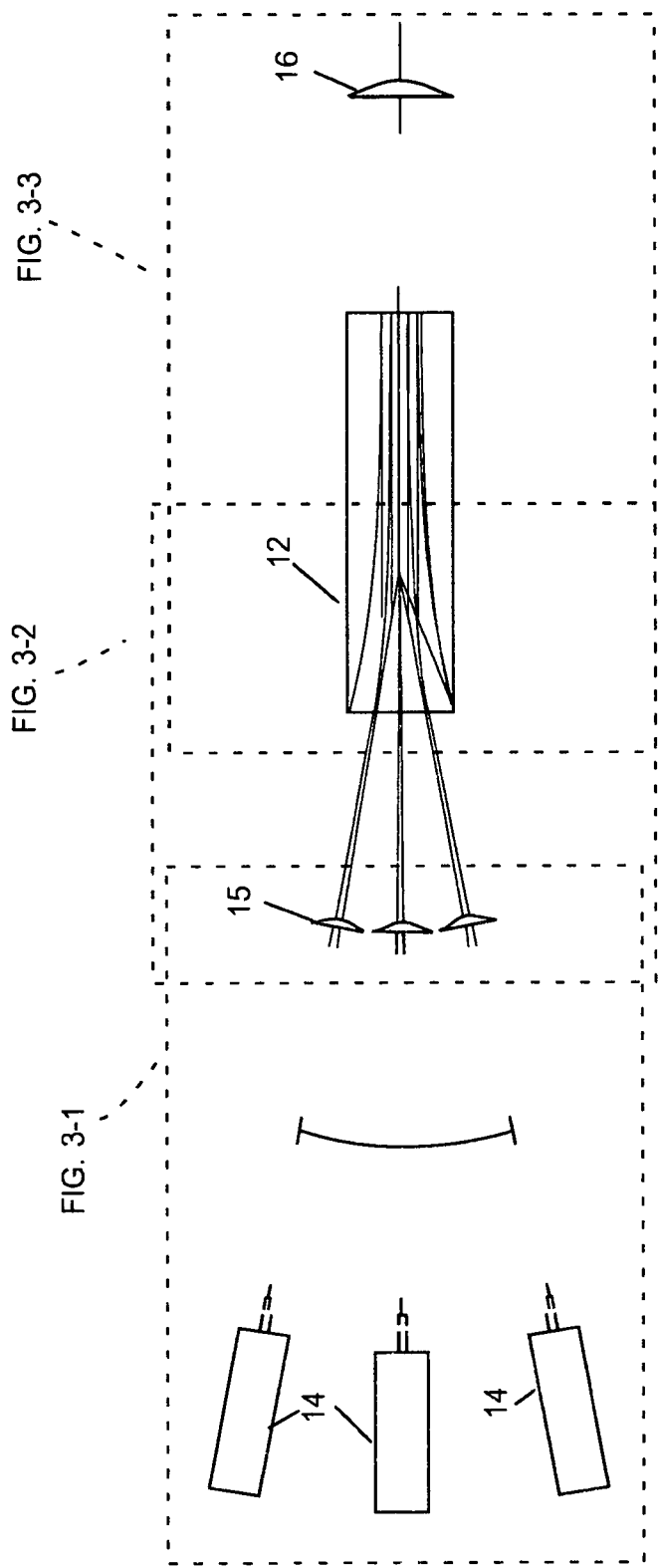
FIG. 3 is a diagrammatic view of a negative GRIN rod cross-section schematic at ½ P showing three lasers being focused through a lens array at the input of the GRIN lens and the output of the GRIN lens being focused through an output lens. This figure shows the portion of the figure for enlargement purposes.
Figures 1, 3:
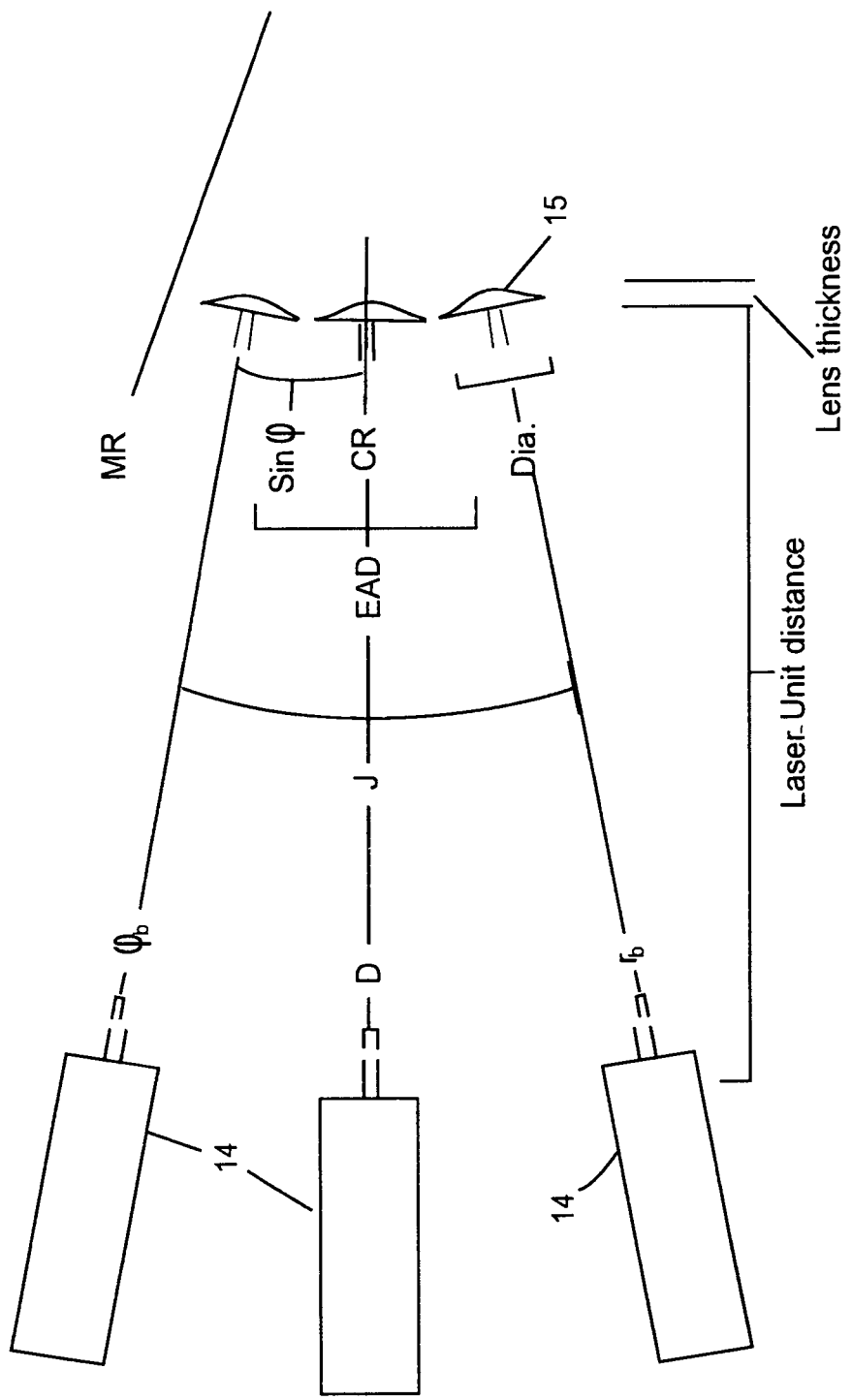
Figures 2, 3:
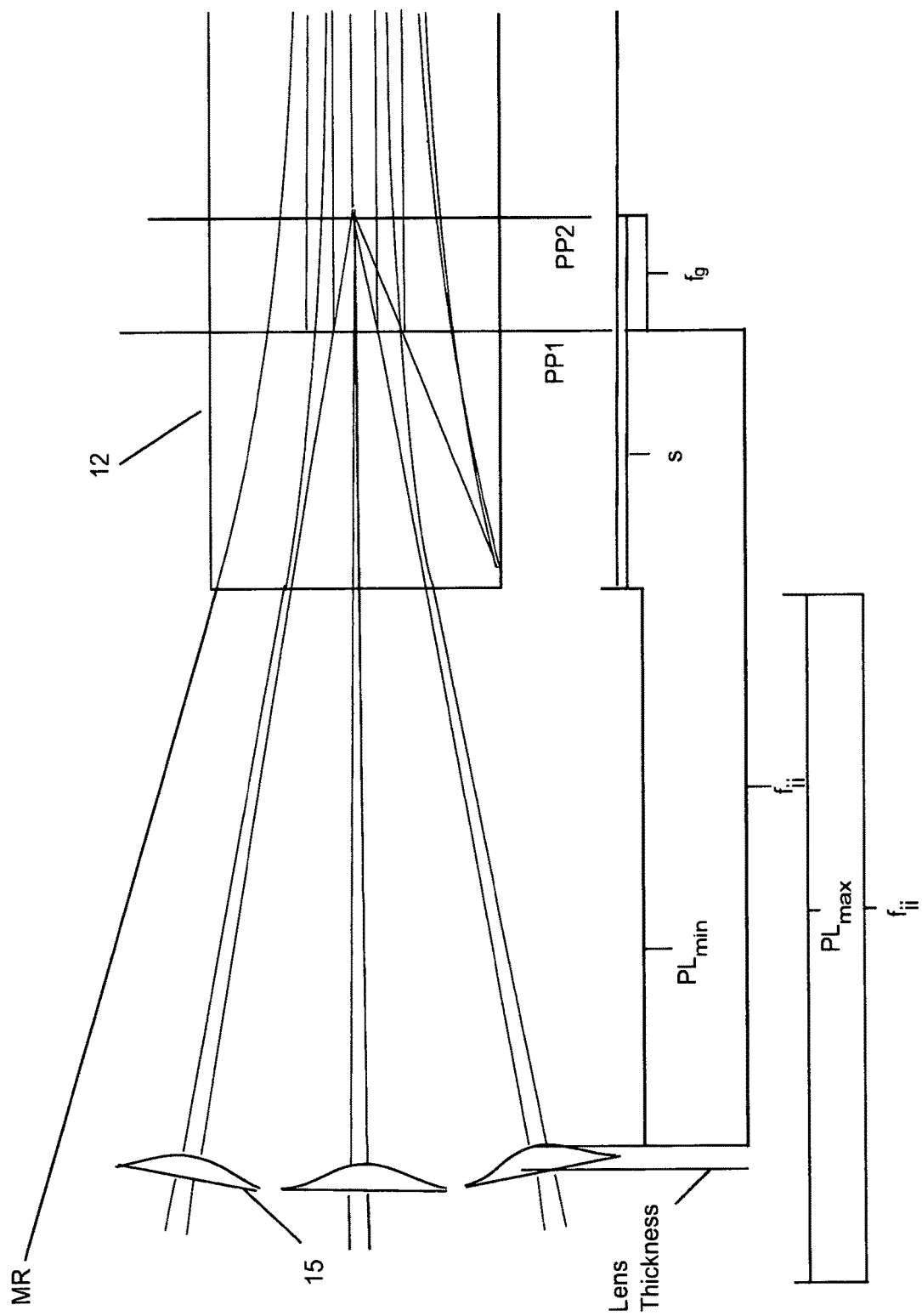
Figure 3:
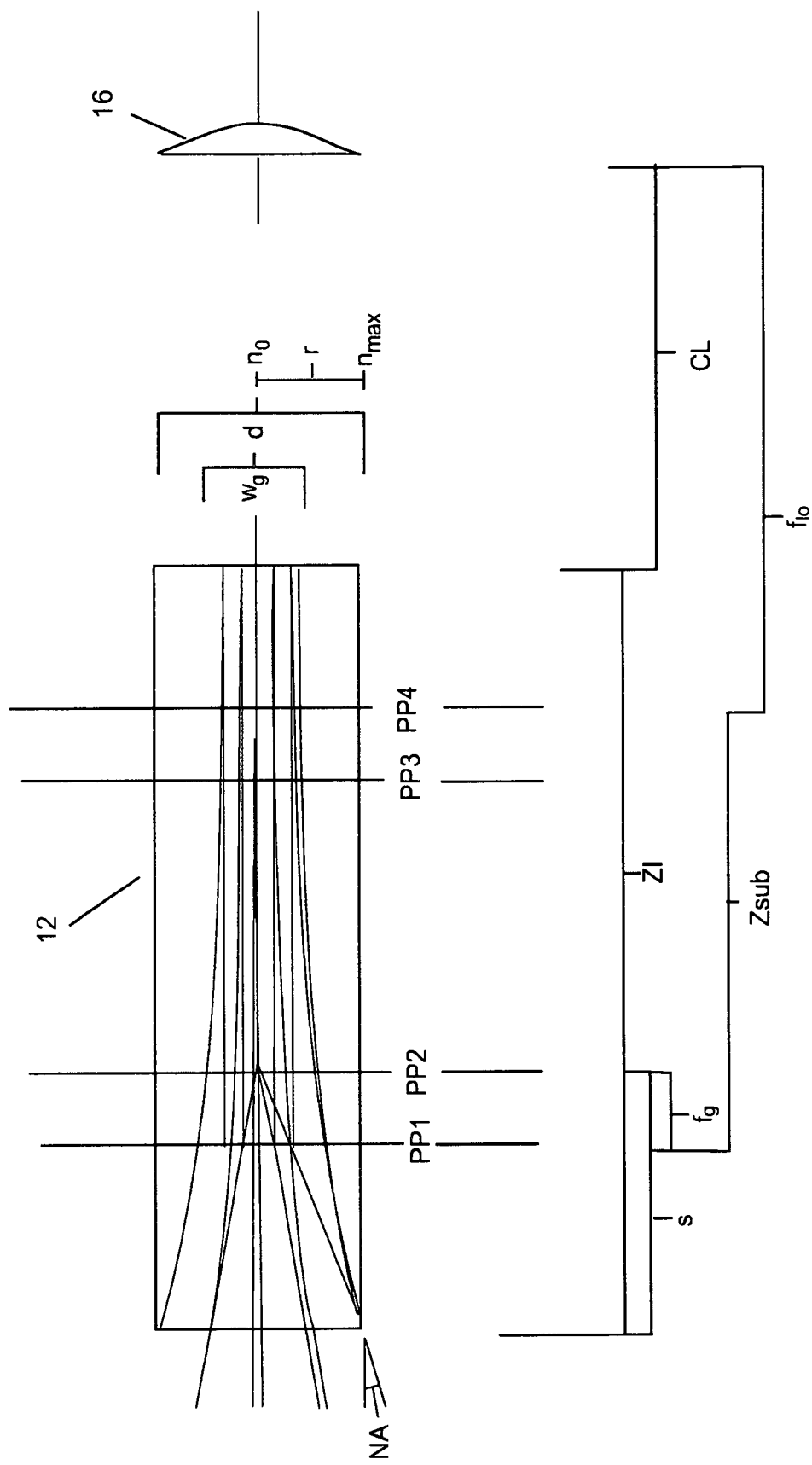

FIG. 3 is a diagrammatic view of a negative GRIN rod 12 cross-section schematic at ½ P showing three lasers 14 being focused through a lens array 15 at the input of the GRIN lens 12 and the output of the GRIN lens 12 being focused through an output lens 16.

FIG. 3-1 is an enlarged diagrammatic view of the left portion of FIG. 3 labeled 3-1. Here, the three lasers 14 are shown along with the lens array 15. The parameters, discussed below, are also shown FIG. 3-2 is an enlarged diagrammatic view of the portion of FIG. 3 labeled 3-2. In this view, the lens array 15 is shown along with the left portion of the grin rod 12. The various parameters shown are discussed in detail below.

FIG. 3-3 is an enlarged diagrammatic view of the portion of FIG. 3 labeled 3-3. Here, the grin rod 12 is shown along with the output lens 16. The various parameters shown are discussed below.

Figure 3A:
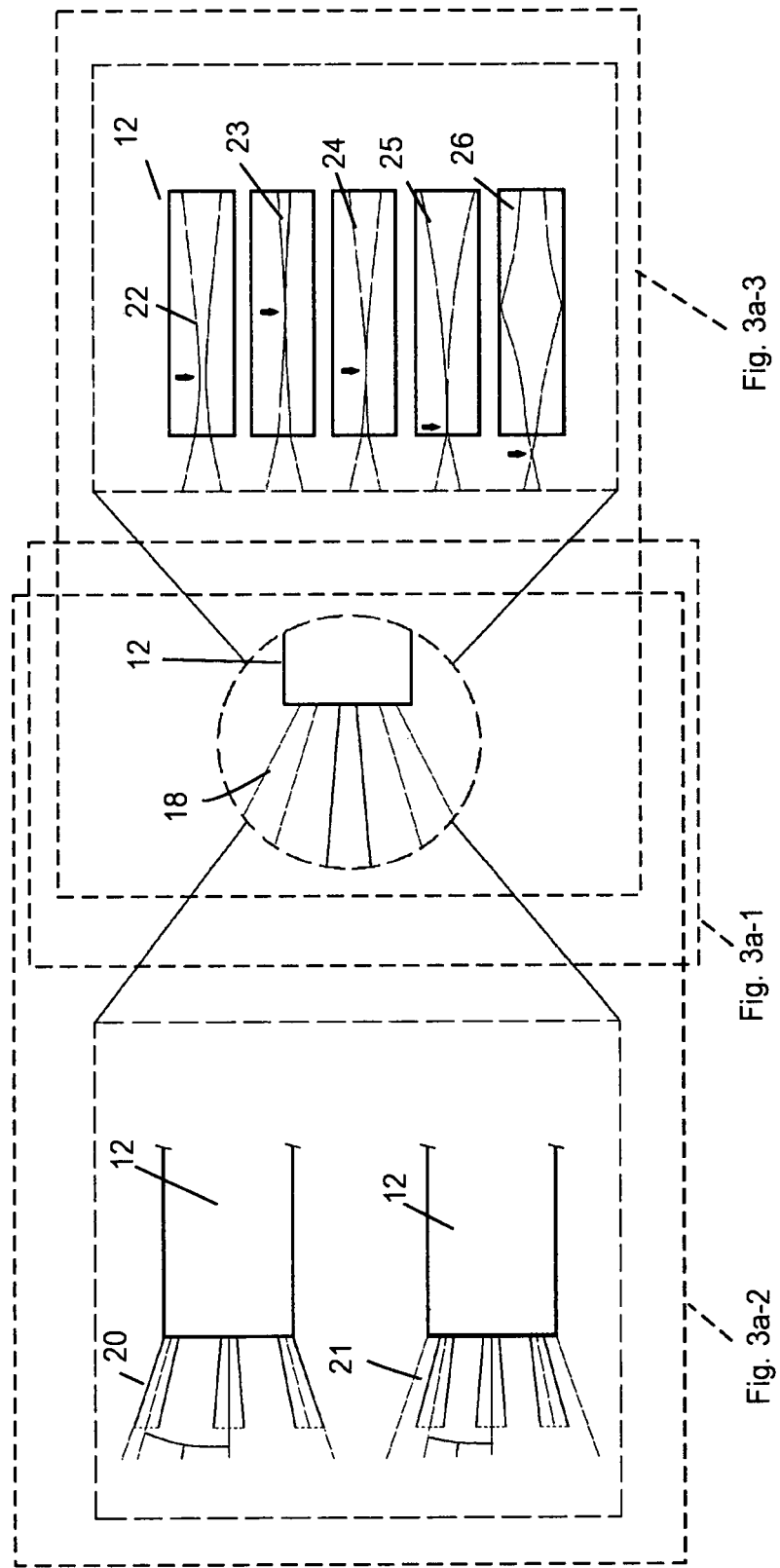
FIG. 3a is a detail view of the GRIN lens of FIG. 3 showing enlarged details from that view.
Figures 1, 3A:
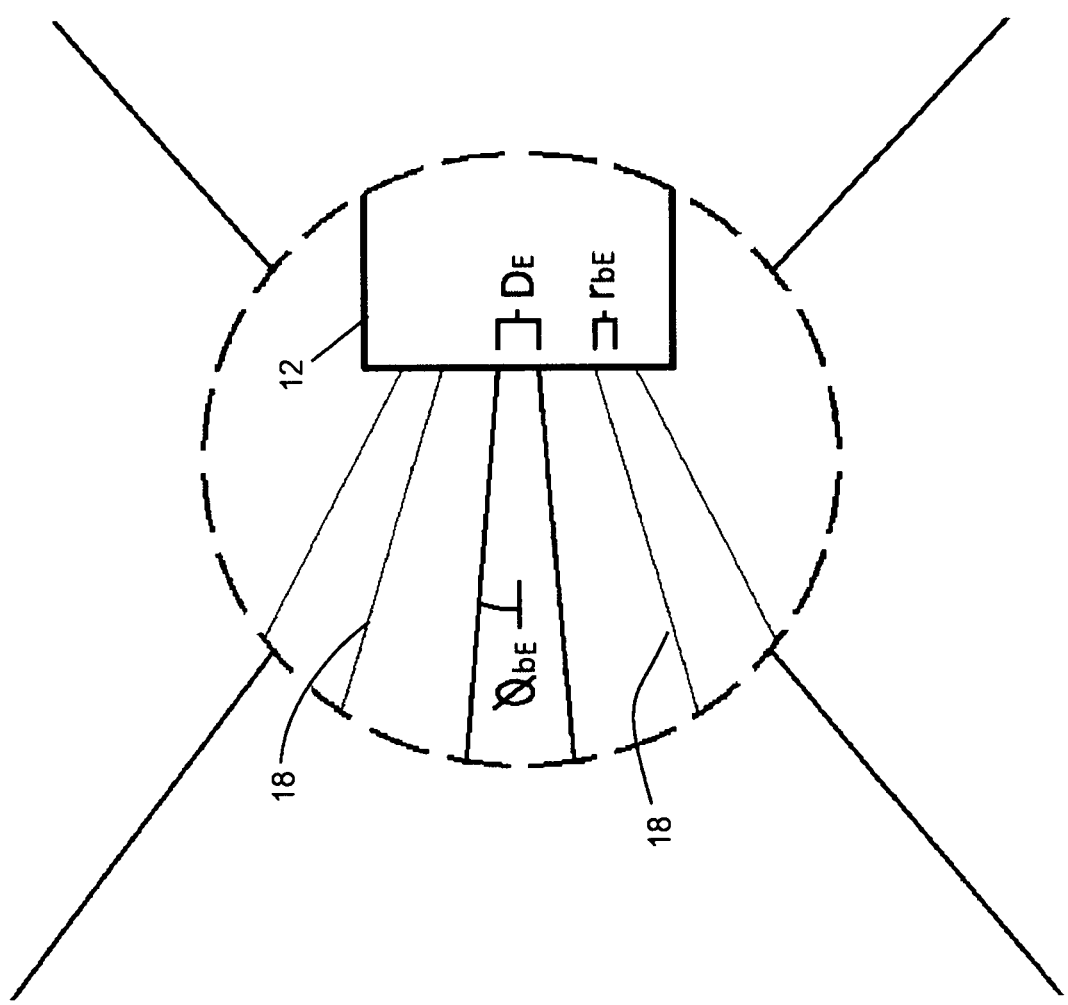
Figures 2, 3A:
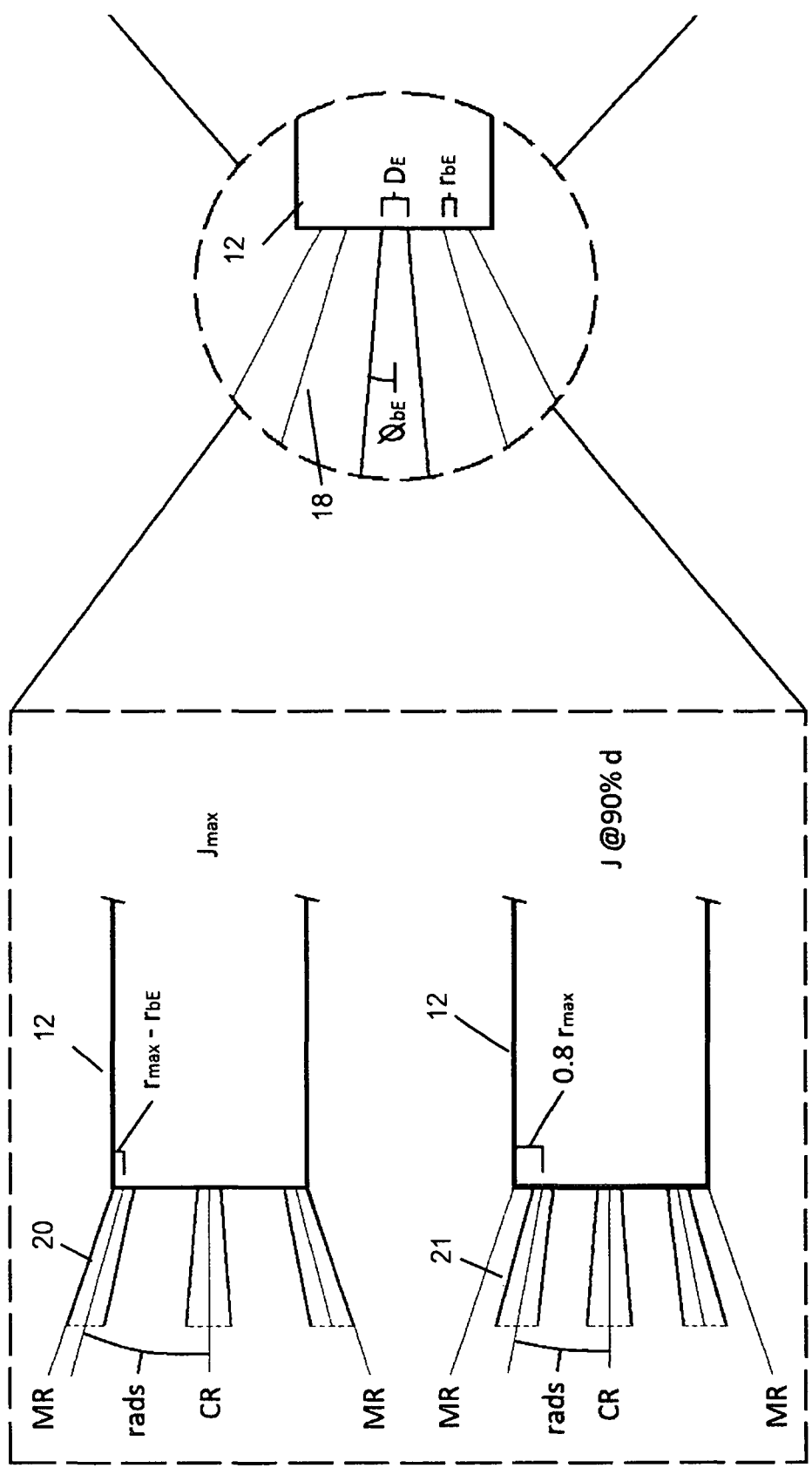
Figures 3, 3A:
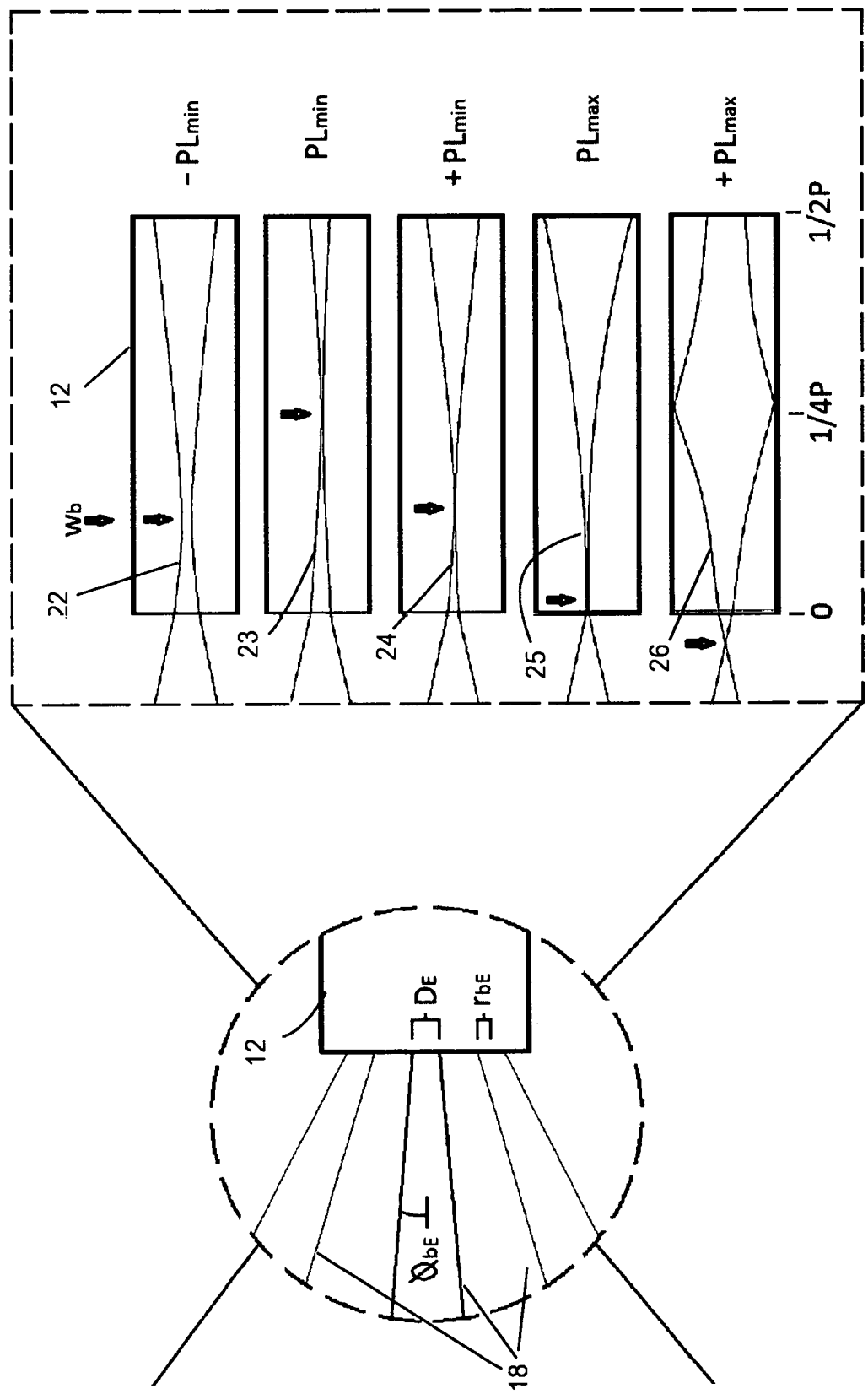

FIG. 3a is a detail view of the GRIN lens of FIG. 3 showing enlarged details from that view. FIG. 3a also shows the delineation of the enlarged detail views on FIG. 3a as FIG. 3a-1, FIG. 3-2 and FIG. 3a-3. FIG. 3a shows, at the center, the left end of the grin rod 12. It shows a number of light rays 18 entering the end of the rod. The left side of the figure (labeled FIG. 3a-2) shows the end of the grin rod 12 with two different inputs 20 and 21 entering the grin rod 12, The right side of the figure, labeled FIG. 3-3 shows the grin rod 12 with four different light patterns moving through it, depending on the particular parameters shown of the detail views below.

FIG. 3a-1 is an enlarged diagrammatic view of the portion of FIG. 3a labeled 3a-1. In this view, The end of the grin rod 12 is shown. The various light rays are shown at vthree angles. The parameters shown are discussed below.

FIG. 3a-2 is an enlarged diagrammatic view of the portion of FIG. 3a labeled 3a-2. Here, the view of FIG. 3-1 is shown smaller. The left part of the figure shows the grin rod 12 with two different sets of input rays, the set of parameters shown on the diagram are discussed below. Similarly, the rays 21 are defined by the parameters shown and discussed below.

FIG. 3a-3 is an enlarged diagrammatic view of the portion of FIG. 3a labeled 3a-3. In this view the left side of the figure shows the information contained in FIG. 3a-1. The right side of the figure shows the grin rod 12 with different light rays entering and the effect the grin rod has on them depending on the parameters shown and discussed below. Five different light rays 22, 23, 24, 25 and 26 are shown.

As shown in FIG. 1, light focused into one end of a positive gradient GRIN rod travels in a sinusoidal path through the rod.

Referring to the FIGS. 2 and 3, in the case of a negative gradient GRIN rod, a cone of light focused into one end of a rod having a length of 1 pitch, at an angle from the normal equaling the numerical aperture (NA) of the rod and a radius equaling the radius of the rod, will travel a hyperbolic path to a focal point, or waist diameter (w), at the center of the rod, and then diverge to exit the opposite end of the rod at the same diameter and angle of divergence as it entered. This angle is termed the acceptance angle (J), which is double the numerical aperture of the rod. For a rod with a length of ½ pitch, a collimated beam entering the rod, with a diameter (D), equaling the waist diameter of the acceptance cone (Wg), will exit the opposite end with a diameter matching that of the rod and an angle matching the acceptance angle. Likewise, a cone of light focused into the rod at the acceptance angle will exit the opposite end as a collimated beam with a diameter equaling the waist diameter of the acceptance cone. For the purposes of this invention, a rod can be used that ranges from ½ pitch to 1 pitch in length, or anywhere in between, depending on the output beam-size and divergence desired The profile of the gradient in a GRIN rod is an important consideration. In imaging applications, a profile that is mostly parabolic, yet slightly more conical than a perfect parabola, is the most desirable for correcting aberration in images. However, for the purposes of this invention, while a gradient with a profile of:

$$n^2(r)=n_0^2(1+(Ar)^2) \qquad (eq. 1)$$

(where n is the refractive index, r is the distance from the optical axis, $n_0$ is the design index on the optical axis, and A is a positive constant) is ideal, because imaging and removal of aberration is not a primary concern; a profile that ranges from a perfect parabola to a perfectly conical profile, or anywhere in between, can be used effectively.

Another method of representing index of refraction profiles in GRIN rods is a polynomial expansion in both the radial component r and the optical axis component z:

$$N(r, z) = \sum_{j=0} \sum_{i=0} N_{ij} r^{2i} z^j \qquad (eq. 2)$$

Assuming only a radial gradient component, the equation above can be expanded as:

$$n^r = n_{00} + n_{10} r^2 + n_{20} r^4 \qquad (eq. 3)$$

equating the terms in eq. 1 and eq. 3, gives:

$$n_{00}=n_0 \text{ and } n_{10}=n_0 A/2 \qquad (eq. 4)$$

In a gradient-index rod, the light not only refracts at the interface, but also continues to refract as it passes through the substrate; thus, a gradient index rod can have perfectly flat faces and still behave as a lens. Moreover, a gradient index rod, even with flat faces, can have a positive or negative focal length. In addition, the surface of the rod can be shaped into a concave or convex lens, to further manipulate the light. A positive lens interface (concave) can be applied to a positive rod or to a negative rod as needed. Likewise, a negative interface (convex) can be applied to either a positive or negative rod. The most common rods, however, are the positive variety; however, only negative rods will work for this purpose.

Referring again to FIGS. 3 and 3a, a light source, or specifically, a laser beam is not an imaginary ray with an infinitely-small diameter. A laser beam has not only a diameter (D) and divergence angle ($\Theta_b$) of its own, but also a Gaussian profile, behaving as its own bundle of rays. Thus, it is only the central ray (axis) of the laser beam that follows the imaginary ray-path through the rod. While one is free to choose any of the infinite number of rays in the bundle of the acceptance cone, along which to aim the laser beams, due to the size of beams and, more importantly, the size of the laser units and optics, one is not free to use all ray paths at the same time but is limited to a finite number of paths depending on the size of the beams, the size of laser units, the diameter of the rod, the acceptance angle, the input optics, and the method of transmission from the laser units to the GRIN rod. (i. e., fiber optic transmission can allow more laser beams to be projected into the acceptance angle than mounting the laser units themselves within the acceptance cone, but at a cost in the necessary focusing optics and divergence of the beams.) Naturally, a larger acceptance angle will allow more lasers to fit within the acceptance cone, although this also requires increasing the gradient. To be able to merge multiple beams, it also requires a rod that is many times the diameter of the beams. This diameter of the rod (d) can range from a few millimeters to many thousands of millimeters; the lower end is limited by the diameter of the input beams while the upper end is only limited by GRIN manufacturing technologies. Currently, due to manufacturing limits, most commercial GRIN rods have a diameter equal to or smaller than most laser beams (a couple of millimeters or less). However, larger GRIN rod do exist.

Referring now to FIG. 3a, when the laser beams are collimated as they enter the rod they will begin diverging upon entry, and exit the opposite end close to or even larger than the diameter of the rod, depending on the beam's entry diameter at the rod interface ($D_E$). Also, the marginal rays of the acceptance cone cannot be used without cutting off half the beam's diameter at the aperture stop, and thus producing drastic diffraction effects. At best, the marginal rays mark the limit where the edge, not the central-axis ray, of the beams at the widest angle of the acceptance cone may enter the rod. Therefore, because the central axis of the beam follows the imaginary meridional-rays through the rod, the outermost beams in the acceptance cone can only enter the rod at a maximum of the angle of the meridional-rays that are a beam's radius distance ($r_b$) from the marginal rays (a slightly shallower angle than the acceptance angle, depending on $D_E$) which is determined by the angle (in radians) of the meridional ray. Thus, beams that enter the rod with a larger diameter will need to enter at a shallower angle than beams with a smaller diameter. In practice, however, usually only 80 to 95% of the rod's face is used, to avoid diffraction near the edges.

By focusing the beams into the rod with an input lens, having a focal length ($f_{li}$) equal to or greater than the distance from the end face of the rod to the apparent focal-point, the input beams can be prevented from diverging after entering the rod. Instead, the central axis of the beam follows the hyperbolic ray-path through the rod, but continues focusing at ever shallower converging-angles (negative divergence) until reaching its smallest waist-diameter (Wb) within the rod.

When the lens is positioned at a distance from the end face of ½ pitch rod, so that the focal point of the lens is exactly at the apparent focal-point, the beams' converging angle becomes thus a fraction or "pizza slice" of the of the overall acceptance angle. However, because the beams have a smaller entry-diameter and divergence angle than the acceptance angle, the beam's true focal-point will thus not be located at the at the output end of the rod, but at a point less than ½ the rod's length. The optimum distance to position the focal point of the input lens is therefore not at the apparent focal point, set at the working length of the lens, but at a distance equaling the working length plus the negative focal length ($f_g$) of the rod, termed the minimum projection-length (or $Pl_{min}$).

Thus, the optimum distance to place the input lens from the end face of the rod is:

$$PL\min=f_{li}-(s+f_g). \qquad (eq. 5)$$

Note that eq. 5 is for the projection length of a certain input lens, not the input lens itself.

Provided that the divergence of the input beam makes-up more than 0.035% of the acceptance angle, the bundle of rays of such a beam entering the rod under these conditions will travel a hyperbolic path of their own, reaching its waist diameter at the ¼ pitch length, and exiting the rod at the ½ pitch length with the same diameter and divergence angle at which it entered. Moving the lens fore or aft of this position will cause an increase in the output divergence and diameter. All beams' axes will then come into alignment with the rod at the ½ pitch length, yet all having a divergence and diameter that match the input divergence and diameter, and can thus be collimated by an output lens equaling the focal length and distance from the end of the rod as the input lens, at virtually the same diameter and divergence as the input beams as they exit the laser units.

Only the beam following the chief ray will exit along the axis of the rod. The axes of the meridional beams will come into alignment with the axis of the rod, each along its imaginary ray's place in the bundle of rays of the acceptance angle (in relation to the rod's axis). However, due to the optical constant:

$$r_b = f_{li} \times \theta_b \qquad (\text{eq. 6})$$

because the input beams are Gaussian and have a much shallower converging angle than the angle of the acceptance cone, the minimum waist diameter of the input beams are of a much larger diameter than the waist size of the of the bundle of imaginary rays of the acceptance cone. Therefore, instead of the multiple input-beams coming into alignment as a single bundle of collimated beams, all running parallel to each other, the beams' axes all come into alignment with the rod while the diameter of the beams overlap each other considerably, with their axes separated by a radial distance equal to the distance of their individual ray-path from the rod's axis. (i. e., the beam following the chief ray will follow the axis straight through the center of the rod, while the axes of the marginal beams of the acceptance cone will exit the rod at the farthest distance from the rod's axis, equaling a total of the waist diameter of the acceptance cone.) Therefore, the individual beams will overlap considerably but not perfectly, and, while overlapping, do not exit the rod as collimated beams but as beams with a divergence angle matching the convergence (focusing) angle of the individual input-beams. Therefore, the merged beams can then be collimated with a lens (or multiple lenses) like a normal beam. If the same focal-length lens is used for collimation that was used for the input beams, positioned at a distance equal to its projection length from the output end of the rod, termed the collimation length (CL), the multiple, overlapping beams can be collimated to behave as a single beam with a diameter equal to the diameter of the input beams plus the waist diameter of the acceptance cone. Similarly, any number of lenses can be used to collimate or focus the output beam to the desired size, including manufacturing the curvature of the proper radius lens into the output end face of the rod.

Figure 4:
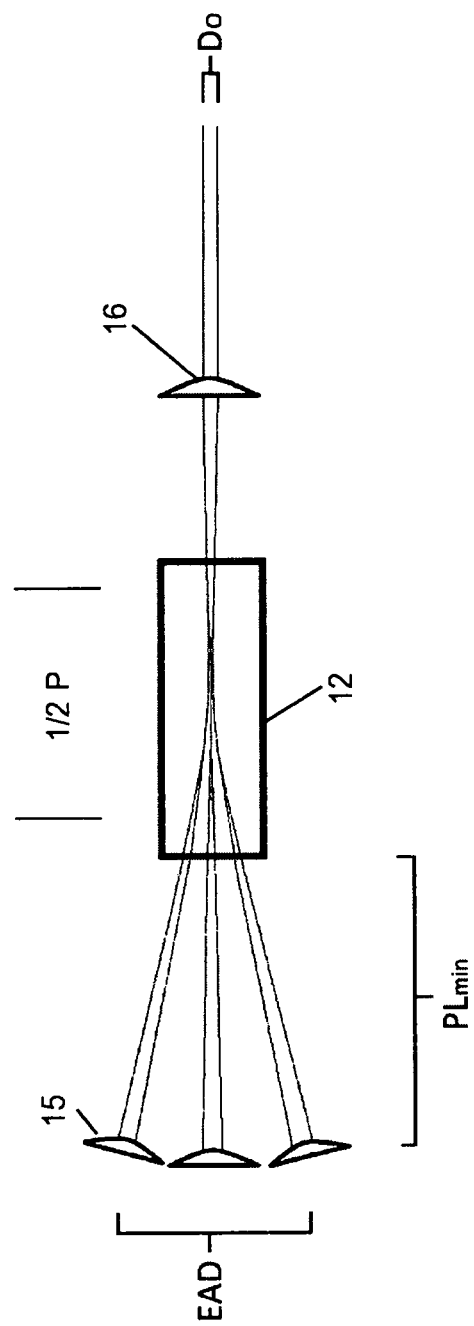
FIG. 4 is a diagrammatic view of several inputs being aimed at a negative gradient ½ P GRIN lens through a lens array positioned at a point labeled Plmin, showing the effect on the output.
Figure 5:
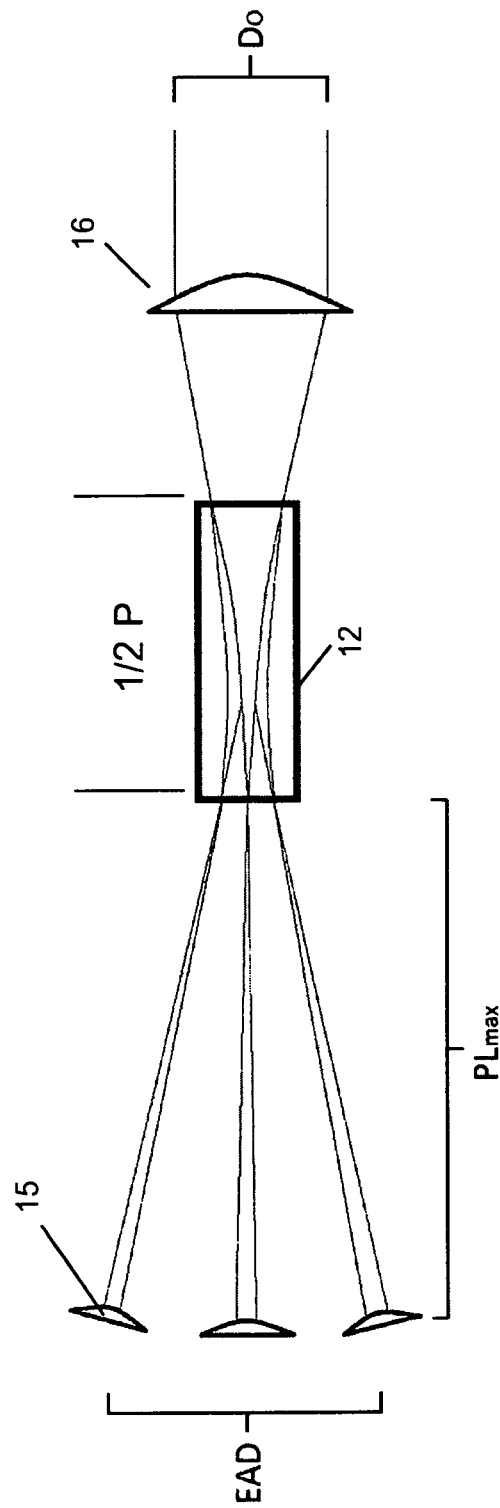
FIG. 5 is a diagrammatic view of several inputs being aimed at a negative gradient ½ P GRIN lens through a lens array positioned at a point labeled Plmax, showing the effect on the output.

The two distances that the input lenses can be placed from the end of the rod are PLmin and Plmax, where PL is the projection length. FIGS. 3a, 4 and 5 show the difference between PLmin and PLmax. The input lenses can be placed anywhere between PLmin and PLmax. At PLmin, the output beam is small, and since power is measured in watts per square centimeter, the output power is limited by the diameter of the merged beam at the ½P length. See, FIG. 4, which shows several inputs being aimed at a negative gradient ½P GRIN lens through a lens array positioned at a point labeled Plmin, showing the effect on the output.

When the lenses are mounted at the PLmax distance, the beam will be very large at the ½P length (the merging point) (see FIG. 5) so the output power can be much higher (simply because the merged beam diameter is larger). At the PLmax length, the damage is then most likely to occur at the input face rather than the ½P length, where the input beams are focused to a point. It is possible to mount the lenses anywhere between PLmin and PLmax, it is even possible to make the point adjustable between the two; however this would be impractical. Placing the lenses anywhere between PLmin and Plmax changes the output diameter and divergence of the merged beams. If the input lens is positioned beyond these two lengths, no further benefit is found. If the input lens is positioned to focus beyond the working length plus the rod's focal length, the output beams will exit as thin, curved lines perpendicular to their input angle. If the input lens is placed at a distance from the end of the rod that is farther than its focal length, the output beams will reach the diameter of the rod before exiting, coming into contact with the rods outer wall. See, e. g., FIG. 3a.

As noted above, the maximum output-power of the merged beams is limited by the damage threshold of the GRIN rod at the waist diameter of the merged beams. For most lens substrates, this is often in the range of tens to hundreds of joules per square centimeter for a picosecond pulse or several kilowatts per square centimeter for continuous beams. Obviously, when larger beams come into alignment with the rod at the merging point, they can have an output with much higher power than a beam at a smaller diameter. This increase in output power comes at a cost in output divergence-angle. When the lens (or lens array) for the input beams is positioned at a distance from the end of the rod equal to its focal length, so that all beams come into focus at the input end of the rod, the merged output-beams can be made to exit the rod at a very large diameter, from 60 to 90% of the rod's diameter, but with a much larger divergence-angle. See, FIG. 5, for example.

The "merging point" is where all beams merge and come into alignment with the rod. The merging point is always at the ½ pitch length of the rod. (For a ½P rod, it will be at the output end-face of the rod.)

FIGS. 6a-6d show various lens arrangements. These are discussed below.

Figure 7:
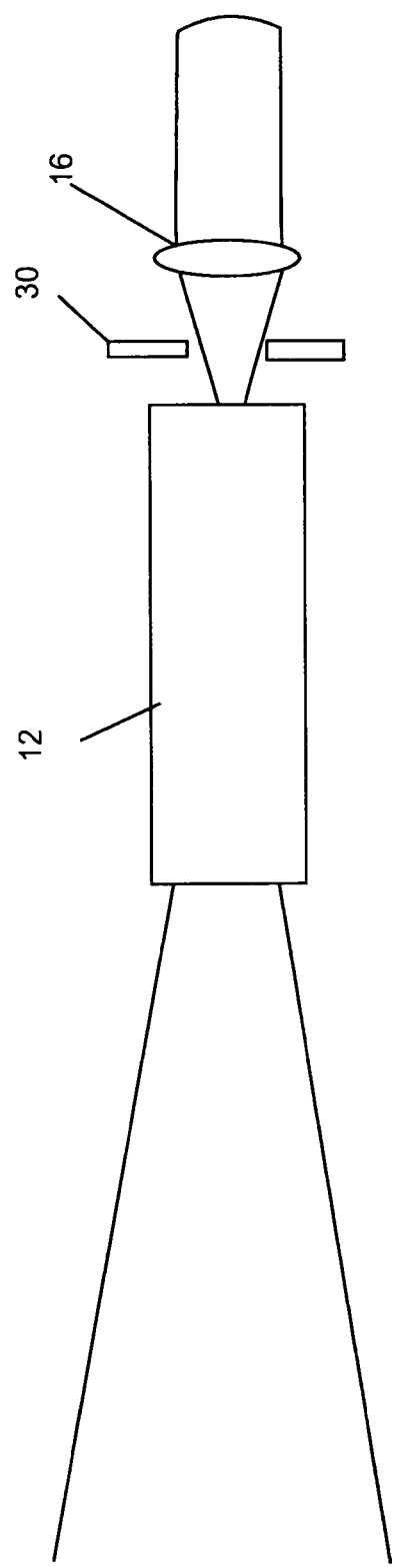
FIG. 7 is a detail view of an aperture being used to control the output of a GRIN lens.

Referring again to FIGS. 3, 3a and 7, the divergence of the merged output-beam will tend to differ slightly from the divergence of the individual beams. Therefore, with minimal use of lenses and other focusing and collimating optics, the beam can be made to behave as a single beam from the near field to the far field. However, the more the beams are manipulated with optics the more they will begin to diverge along different paths. To correct this problem, an aperture 30 can be used, as shown in FIG. 7, which closely matches the diameter of the output beam as it exits the rod 12, at any point along its output cone. Such an aperture creates a new wavefront containing all beams, which can then be manipulated as a single beam or optical image. The overlapping output beams will not typically be coherent with each other, unless a phase matching technique is employed to ensure that all lasers beams are in phase with each other.

Moreover, a larger diameter rod allows more laser beams to be projected into the end face of the rod. However, the maximum diameter of a GRIN rod is often limited by the expense of the manufacturing process. For input beams of 0.5 mm, the minimum rod diameter should be at least 5 mm, providing room for the beams to follow the hyperbolic path to the merging point. There is no limit to the maximum rod-diameter that can be used, but an increase in rod-diameter without a corresponding increase in the gradient produces a gradient that is less steep than a rod with a smaller diameter.

Referring to FIG. 3, a larger rod with same gradient as a smaller rod will have a much smaller gradient constant (A), and therefore will require a much greater length ($z_l$) to reach the half-pitch length (½P). The half-pitch length of the rod is determined by the equation:

$$1/2P = \frac{2\pi}{A} \div 2 \qquad (\text{eq. 7})$$

Where P is pitch and A is positive constant.

The acceptance angle of the rod is double the numerical aperture (NA) at the rod's circumference (rmax), which is a function of the rod's gradient, as described by:

$$NA = \sqrt{n_0^2 - n_{rmax}^2} = n_o\sqrt{1 - \text{sech}^2\left(\frac{Ad}{2}\right)} \qquad (\text{eq. 8})$$

Thus, regardless of the diameter of the rod, if the gradient in all sizes is the same then both the numerical aperture and the acceptance angle will also be the same. A larger acceptance angle allows more lasers to fit within the acceptance cone, but achieving this requires a rod with a larger gradient. Typical gradients for GRIN rods range from 0.08 to 0.145, although emerging technologies are beginning to producing larger gradients.

Because the refractive index is determined by the wavelength of the light, these values are all dependent upon the wavelength of the input lasers.

The acceptance angle penetrates into the rod, following imaginary ray-lines, through the first principal-plane (PP1) and converging at the second principal-plane (PP2), at the spot termed the apparent focal-point. See, for example, FIG. 3. The distance from the input end-face of the rod to the apparent focal point is termed the working length (s), determined by:

$$s = r \div NA = \frac{1}{n_0 A \tanh(AZ_l)} \qquad (\text{eq. 9})$$

An input lens must have a focal length the exceeds the working length plus the rod's focal length. This lens can be placed at a minimum projection-length (PLmin), producing a very small output beam with lower divergence. It can also be placed at a distance from the end of the rod equaling the lens' focal length, so the lasers focus on the input end-face of the rod, termed the maximum projection length (PLmax). This will produce a much larger output beam, near or equaling the diameter of the rod, with higher divergence nearly equaling the numerical aperture of the rod. See FIG. 5. The focal length ($f_g$) of the rod, determined by:

$$f_g = \frac{1}{n_0 A \sinh(AZ_1)} \qquad (\text{eq. 10})$$

The divergence and waist diameter of a cone of light are reciprocal, determined by the focal length, thus a rod with a shorter focal length will have a smaller waist diameter (Wg) than a rod with a longer focal length. Thus, the merged beams will overlap more with rods that have a shorter focal length, but will also have an increase in divergence among individual axes of the individual beams. On the other hand, the divergence of the individual beams is determined by the focal length of the input lens, as is the waist diameter ($W_b$) of the individual beams, which will be larger than the waist diameter ($W_g$) of the acceptance cone.

Although the above discussion focuses on rods of ½ pitch, rods can be used that range from ½ to 1 pitch in length. For rods longer than ½ pitch, once the laser beams come into alignment with the rod's axis, the axes of the beams remain in line with the rod until exiting. The circumferences of the beams then begin diverging in accordance with the gradient of the rod, exiting with a much larger diameter and divergence. However, because increasing the length of the rod decreases both its focal length and waist diameter, this cost comes at a benefit of reduced divergence and closer alignment among the axes of the individual beams.

Figure 8:
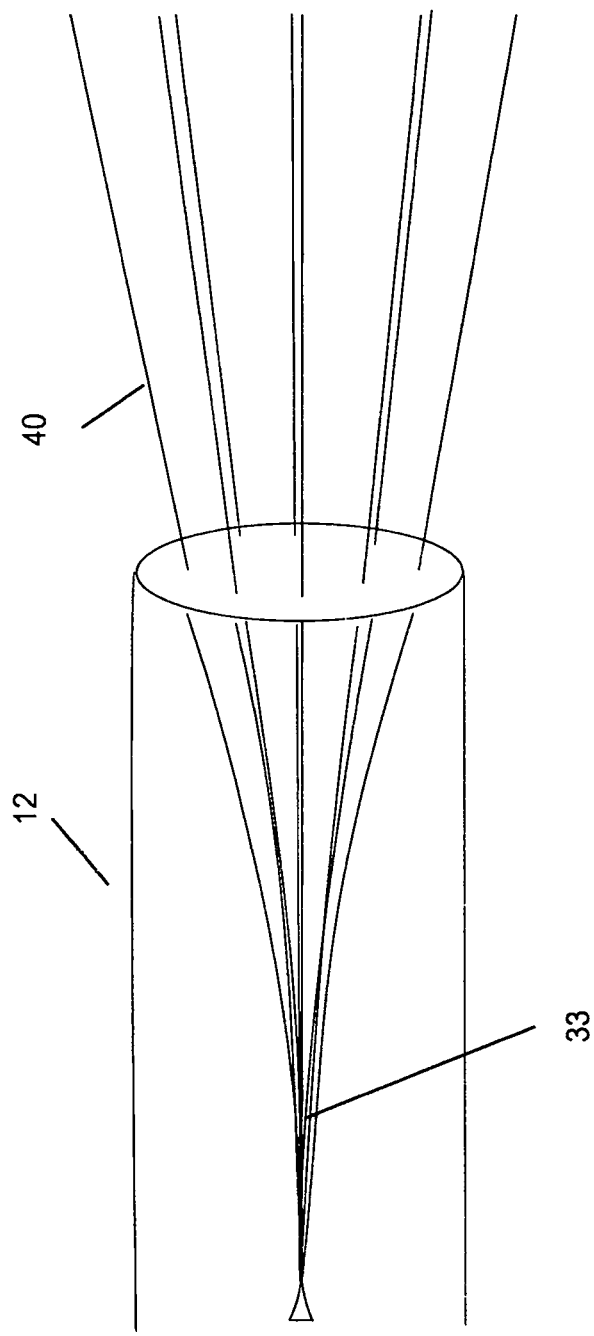
FIG. 8 is a diagrammatic view of a laser projected into a GRIN rod at a specific angle that shows the beam can be made to come into alignment with the rod in the center.

Most optics rely on the substrate/air interface in order to change the direction of a ray of light. The sudden difference between the refractive index between the air and substrate, in combination with the shape of the interface, determines how much a ray with a certain angle of incidence (input angle) changes direction. However, once inside the substrate, the ray once again travels in a perfectly straight line. This poses many limitations on an optical system, as a beam's direction and divergence is controlled only by the shape of the interface and angle of incidence. A GRIN rod continues to change in refractive index after a beam passes through the interface, allowing a beam to follow a curved path. For example, FIG. 8 is a diagrammatic view of a laser 35 projected into a GRIN rod 12 at a specific angle that shows the beam can be made to come into alignment with the rod in the center. However, at that point, the beam 40 begins diverging equally in all directions.

There are many ways to measure gradient. In large enough sizes this can be done by cutting off a slice and shining a very narrow laser beam through at an angle, then measuring the refracted angle at each consecutive point across the radius. (This is rather painstaking, but the only way to determine the exact gradient profile without expensive equipment.) An inexact method of determining profile is to photograph a grid through the rod mapping out distortions in the grid lines. Another way is to determine the numerical aperture, and calculate the gradient by:

$$\nabla f = (\sqrt{n_0} + NA)^2 - n_0 \qquad (\text{eq. 11})$$

Where $\nabla f$ is the Gradient, $n_0$ is the design index on the optical axis and NA is the numerical aperture, but this determines only the gradient without considering the profile.

Input lenses come in many different diameters, but these examples are focused on the three most used, which are 25.4 mm, 12.7 mm, and 6.35 mm. The diameter of the lens (Dia) determines how many lenses can be placed within the acceptance cone at a specific projection length, termed the effective array diameter (EAD), and this is the main limitation to how many lasers can be used.

The following examples cover a range of gradients. However, all are done with the same diameter rod (1 inch).

In the examples below, all input lasers have a collimated beam with a diameter of 3 mm. The distance that these are mounted can vary greatly, since the beam itself is collimated, allowing lasers of rather large sizes to be fitted into the acceptance cone. (Lasers like bare diodes that have a highly divergent beam need to be mounted at precise distances, but these have not been included in these examples).

Example 1: 25.4 mm rod with a gradient of −0.121
n0—1.49
nrmax—1.6114
Gradient constant (A)—0.002577165

½ Pitch length ½ P)—1219.01 mm
Numerical aperture (NA)—0.04875 rads
Acceptance angle (J)—0.0975 rads
Working length (s)—271.63 mm
Focal length ($f_g$)—-23.37 mm
90% rod diameter—23 mm
J@90% —0.08775 rads
Distance to PP1—238.65 mm
*Input lens—400 mm positive focal-length At 90% of the rod's diameter, the acceptance angle becomes 0.08775 rads. By mounting an input array of 400 mm lenses at a minimum projection length (PLmin) of 161.35 mm from the input end-face of the rod, the beams will enter the rod with a diameter (DE) of 1.21 mm. At this projection length, the effective array diameter (EAD) becomes 37.07 mm. 4 lenses with a diameter (Dia.) of 25.4 mm can be fitted within the acceptance cone at this distance (2 lenses directly across the EAD, each separated by an angle normal to the lenses' axes of 0.08775 rads, leaving a space of 11.65 mm between them at their edges). At a lens diameter of 12.7 mm, 7 lenses can be mounted within the acceptance cone (3 across the EAD, each separated by an angle of 0.043875 rads, leaving a space of 5.84 mm between them at their edges). At a lens diameter of 6.35 mm, 30 lenses can be mounted (6 across the EAD, each separated by an angle of 0.01755 rads, leaving a space of 1.06 mm between them at their edges). The resulting beams will exit with a diameter of 1.21 mm, and can then be collimated into a beam with a 400 mm focal-length lens of any diameter, provided it is equal to or larger than the combined output beam, positioned at a collimation length (CL) of 161.35 mm from the output end of the rod.

*Input lens—500 mm focal length
By mounting an input array of 500 mm lenses at a minimum projection length (PLmin) of 261.35 mm from the input end-face of the rod, the beams will enter the rod with a diameter (DE) of 1.57 mm. At this projection length, the effective array diameter (EAD) becomes 45.84 mm. 4 lenses with a diameter (Dia.) of 25.4 mm can be fitted within the acceptance cone at this distance (2 lenses across the EAD, each separated by an angle normal to the lenses' axes of 0.08775 rads, leaving a space of 20.45 mm between them at their edges). At a lens diameter of 12.7 mm, 14 lenses can be mounted within the acceptance cone (4 across the EAD, each separated by an angle of 0.02925 rads, leaving a space of 5.84 mm between them at their edges). At a lens diameter of 6.35 mm, 52 lenses can be mounted (8 across the EAD, each separated by an angle of 0.0125357 rads, leaving a space of 0.199 mm between them at their edges). The resulting beams will exit with a diameter of 1.57 mm, and can then be collimated into a beam with a 500 mm focal-length lens of any diameter, provided it is equal to or larger than the combined output beam, positioned at a collimation length (CL) of 261.35 mm from the output end of the rod.

Example 2: 25.4 mm rod with a gradient of 0.1893
n0—1.49
nrmax—1.6793
Gradient constant (A)—0.003978740%
Pitch length (½ P)—789.6 mm
Numerical aperture (NA)—0.07522513 rads
Acceptance angle (J)—0.15045026 rads
Working length (s)—169.26 mm
Focal length ($f_g$)—14.59 mm
90% rod diameter—23 mm
J@90% —0.135405234 rads
Distance to PP1—154.67 mm
*Input lens—300 mm positive focal-length At 90% of the rod's diameter, the acceptance angle becomes 0.135405234 rads. By Mounting an input array of 300 mm lenses at a minimum projection length (PLmin) of 145.33 mm from the input end-face of the rod, the beams will enter the rod with a diameter (DE) of 1.45 mm and convergence angle of 0.005 rads. At this projection length, the effective array diameter (EAD) becomes 42.6 mm. 4 lenses with a diameter (Dia.) of 25.4 mm can be fitted within the acceptance cone at this distance (2 lenses across the EAD, each separated by an angle normal to the lenses' axes of 0.135405234 rads, leaving a space of 17.2 mm between them at their edges). At a lens diameter of 12.7 mm, 14 lenses can be mounted within the acceptance cone (4 across the EAD, each separated by an angle of 0.045135078 rads, leaving a space of 1.5 mm between them at their edges). At a lens diameter of 6.35 mm, 37 lenses can be mounted (7 across the EAD, each separated by an angle of 0.022567539 rads, leaving a space of 0.749 mm between them at their edges). The resulting beams will exit with a diameter of 1.45 mm and divergence angle of 0.005 rads, and can then be collimated into a beam with a 300 mm focal-length lens of any diameter, provided it is equal to or larger than the combined output beam, positioned at a collimation length (CL) of 145.33 mm from the output end of the rod.

*Input lens—400 mm focal length
By mounting an input array of 400 mm lenses at a minimum projection length (PLmin) of 245.33 mm from the input end-face of the rod, the beams will enter the rod with a diameter (DE) of 1.84 mm and convergence angle of 0.00375 rads: At this projection length, the effective array diameter (EAD) becomes 56.14 mm. 7 lenses with a diameter (Dia.) of 25.4 mm can be fitted within the acceptance cone at this distance (3 lenses across the EAD, each separated by an angle normal to the lenses' axes of 0.067702617 rads, leaving a space of 2.67 mm between them at their edges). At a lens diameter of 12.7 mm, 19 lenses can be mounted within the acceptance cone (5 across the EAD, each separated by an angle of 0.033851309 rads, leaving a space of 1.34 mm between them at their edges). At a lens diameter of 6.35 mm, 61 lenses can be mounted (9 across the EAD, each separated by an angle of 0.016925654 rads, leaving a space of 0.667 mm between them at their edges). The resulting beams will exit with a diameter of 1.57 mm and a divergence angle of 0.00375 rads, and can then be collimated into a beam with a 400 mm focal-length lens of any diameter, provided it is equal to or larger than the combined output beam, positioned at a collimation length (CL) of 245.33 mm from the output end of the rod.

Example 3: 25.4 mm rod with a gradient of 0.25
n0—1.49
nrmax—1.73996%
Pitch length (½ P)—603.15 mm
Gradient constant (A)—0.005208661
Numerical aperture (NA)—0.098422535 rads
Acceptance angle (J)—0.19684507 rads
Working length (s)—129.8 mm
Focal length ($f_g$)—-11.15 mm
90% rod diameter—23 mm
J@90% —0.177160563 rads
Distance to PP1—118.65 mm
*Input lens—300 mm positive focal-length At 90% of the rod's diameter, the acceptance angle becomes 0.177160563 rads. By mounting an input array of 300 mm lenses at a minimum projection length (PLmin) of 181.35 mm from the input end-face of the rod, the beams will enter the rod with a diameter (DE) of 1.81 mm and a convergence angle of 0.005 rads. At this projection length, the effective array diameter (EAD) becomes 55.12 mm. 7 lenses with a diameter (Dia.) of 25.4 mm can be fitted within the acceptance cone at this distance (3 lenses across the EAD, each separated by an angle normal to the lenses' axes of 0.088580282 rads, leaving a space of 2.16 mm between them). At a lens diameter of 12.7 mm, 19 lenses can be mounted within the acceptance cone (5 across the EAD, each separated by an angle of 0.044290141 rads, leaving a space of 1.08 mm between them). At a lens diameter of 6.35 mm, 61 lenses can be mounted (9 across the EAD, each separated by an angle of 0.022145070 rads, leaving a space of 0.539 mm between them). The resulting beams will exit with a diameter of 1.81 mm and a divergence angle of 0.005 rads, and can then be collimated into a beam with a 300 mm focal-length lens of any diameter, provided it is equal to or larger than the combined output beam, positioned at a collimation length (CL) of 181.35 mm from the output end of the rod.

*Input lens—400 mm focal length

By mounting an input array of 400 mm lenses at a minimum projection length (PLmin) of 281.35 mm from the input end-face of the rod, the beams will enter the rod with a diameter (DE) of 2.11 mm and a convergence angle of 0.00375 rads. At this projection length, the effective array diameter (EAD) becomes 72.84 mm. 7 lenses with a diameter (Dia.) of 25.4 mm can be fitted within the acceptance cone at this distance (3 lenses across the EAD, each separated by an angle normal to the lenses' axes of 0.088580282 rads, leaving a space of 11.02 mm between them). At a lens diameter of 12.7 mm, 30 lenses can be mounted within the acceptance cone (6 across the EAD, each separated by an angle of 0.035432113 rads, leaving a space of 1.87 mm between them). At a lens diameter of 6.35 mm, 130 lenses can be mounted (12 across the EAD, each separated by an angle of 0.016105506 rads, leaving a space of 0.271 mm between them). The resulting beams will exit with a diameter of 2.11 mm and a divergence angle of 0.00375 rads, and can then be collimated into a beam with a 400 mm focal-length lens of any diameter, provided it is equal to or larger than the combined output beam, 10 positioned at a collimation length (CL) of 281.35 mm from the output end of the rod.

Example 4: 25.4 mm rod with a gradient of 0.3043
n0—1.49
nrmax—1.79434
½ Pitch length (½ P)—499.04 mm
Gradient constant (A)—0.006295275
Numerical aperture (NA)—0.118872549 rads
Acceptance angle (J)—0.237745098 rads
Working length (s)—106.93 mm
Focal length ($f_g$)—-9.21 mm
90% rod diameter—23 mm
J@90% —0.213970588 rads
Distance to PP1—97.72 mm

*Input lens—200 mm positive focal-length

At 90% of the rod's diameter, the acceptance angle becomes 0.213970588 rads. By mounting an input array of 200 mm focal-length lenses at a minimum projection length (PLmin) of 102.28 mm from the input end-face of the rod, the beams will enter the rod with a diameter (DE) of 1.53 mm and a convergence angle of 0.0075 rads. At this projection length, the effective array diameter (EAD) becomes 44.77 mm. 4 lenses with a diameter (Dia.) of 25.4 mm can be fitted within the acceptance cone at this distance (2 lenses across the EAD, each separated by an angle normal to the lenses' axes of 0.213970588 rads, leaving a space of 19.35 mm between them). At a lens diameter of 12.7 mm, 14 lenses can be mounted within the acceptance cone (4 across the EAD, each separated by an angle of 0.071323539 rads, leaving a space of 2.23 mm between them). At a lens diameter of 6.35 mm, 52 lenses can be mounted (8 across the EAD, each separated by an angle of 0.030567227 rads, leaving a space of 0.045 mm between them). The resulting beams will exit with a diameter of 1.53 mm and a divergence angle of 0.0075 rads, and can then be collimated into a beam with a 200 mm focal-length lens of any diameter, provided it is equal to or larger than the combined output beam, positioned at a collimation length (CL) of 102.28 mm from the output end of the rod.

*Input lens—300 mm focal length

By mounting an input array of 300 mm lenses at a minimum projection length (PLmin) of 202.28 mm from the input end-face of the rod, the beams will enter the rod with a diameter (DE) of 2.02 mm and a convergence angle of 0.005 rads. At this projection length, the effective array diameter (EAD) becomes 66.16 mm. 7 lenses with a diameter (Dia.) of 25.4 mm can be fitted within the acceptance cone at this distance (3 lenses across the EAD, each separated by an angle normal to the lenses' axes of 0.106985294 rads, leaving a space of 7.68 mm between them). At a lens diameter of 12.7 mm, 30 lenses can be mounted within the acceptance cone (6 across the EAD, each separated by an angle of 0.042794118 rads, leaving a space of 0.531 mm between them). At a lens diameter of 6.35 mm, 91 lenses can be mounted (11 across the EAD, each separated by an angle of 0.021397058 rads, leaving a space of 0.266 mm between them). The resulting beams will exit with a diameter of 2.02 mm and a divergence angle of 0.005 rads, and can then be collimated into a beam with a 300 mm focal-length lens of any diameter, provided it is equal to or larger than the combined output beam, positioned at a collimation length (CL) of 202.28 mm from the output end of the rod.

Figure 6A:
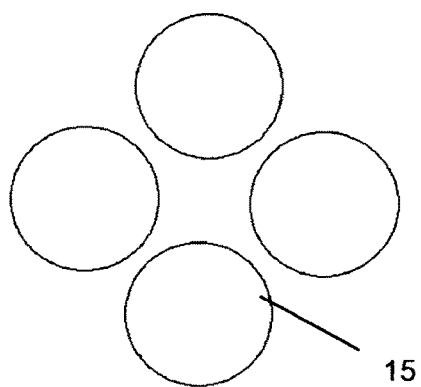
FIG. 6a is a front detail view of a four lens array.
Figure 6B:
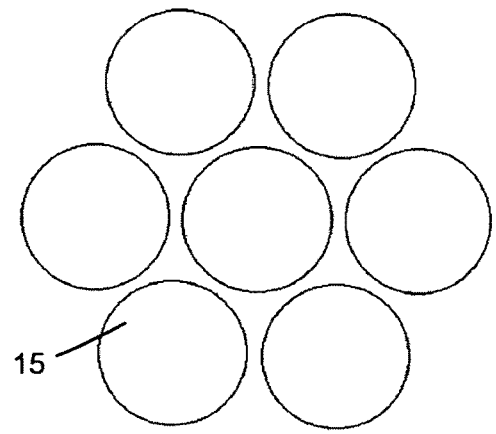
FIG. 6b is a front detail view of seven lens array.
Figure 6C:
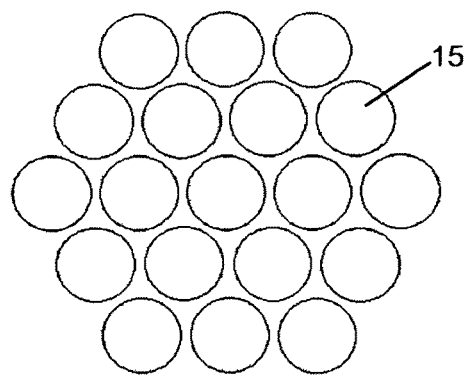
FIG. 6c is a front detail view of 19 lens array.
Figure 6D:
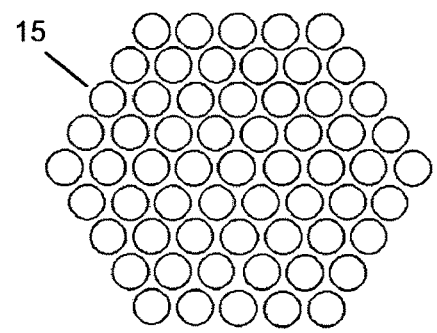
FIG. 6d is a front detail view of 61 lens array.

There is no limit to the number of laser beams that can be projected into the input face of a GRIN rod. The power limit of the rod is determined by the damage threshold of the substrate material in the waist diameter. As discussed above, lens arrays can be used to focus many laser beams onto the face of the GRIN lens. FIG. 6a is a front detail view of a four lens array showing lenses 15. FIG. 6b is a front detail view of seven lens array showing lenses 15. FIG. 6c is a front detail view of a 19 lens array showing lenses 15. FIG. 6d is a front detail view of 61 lens array showing lenses 15. The only limitation as to the number of lenses is the space required to mount the lasers, the number and size of the lenses used and the position of the array within the effective array diameter (EAD) of the acceptance cone with respect to the GRIN lens (See the discussion above for the effects of positioning of the lens arrays.

The present disclosure should not be construed in any limited sense other than that limited by the scope of the claims having regard to the teachings herein and the prior art being apparent with the preferred form of the invention disclosed herein and which reveals details of structure of a preferred form necessary for a better understanding of the invention and may be subject to change by skilled persons within the scope of the invention without departing from the concept thereof.

I claim:

1. An apparatus for combining multiple laser beams comprising:
   a) a radial gradient-index lens having a negative focal-length and having an input face and an exit face;
   b) at least two lasers producing two laser beams; and c) a lens array positioned between said at least two lasers and said input face of said radial gradient-index lens; wherein when said at least two laser beams exit said radial gradient-index lens, said at least two laser beams are collimated within said radial gradient-index lens.

2. The apparatus of claim 1 further comprising an exit lens, positioned apart from the exit face of said radial gradient-index lens.

3. The apparatus of claim 2 wherein the exit lens is positioned at a specified distance from the exit face of said radial gradient-index lens.

4. The apparatus of claim 3 wherein the exit lens has a diameter of 25.4 mm.

5. The apparatus of claim 1 wherein the lens array comprises four lenses, each having a diameter of 12.7 mm.

6. The apparatus of claim 1 wherein the lens array comprises 30 lenses, each having a diameter of 6.35 mm.

7. The apparatus of claim 1 wherein the lens array positioned between said at least two lasers and said input face of said radial gradient-index lens is positioned at a minimum projection-length ($Pl_{min}$).

8. The apparatus of claim 7 wherein the minimum projection-length ($Pl_{min}$) is defined by the expression: $PLmin = f_{li} - (s + f_g)$ where $f_{li}$ is a focal length of the input lens array, s is a working length and $f_g$ is the negative focal length of the radial gradient-index lens.

9. The apparatus of claim 8 where the working length (s) of the radial gradient-index lens is defined by the expression:

$$s = r \div NA = \frac{1}{n_0 A \tanh(AZ_l)},$$

where r is the distance from the optical axis, NA is the numerical aperture of the radial gradient-index lens, $n_0$ is the design index on the optical axis, A is a positive constant and $Z_l$ is the length to reach the half-pitch length (½ P) of the radial gradient-index lens.

* * * * *